July 30, 1968   H. HODKINSON   3,394,780
AIR COOLED BRAKE DISC
Filed July 18, 1966

3,394,780
AIR COOLED BRAKE DISC
Harold Hodkinson, Finham, near Coventry, England, assignor to Dunlop Rubber Company Limited, London, England, a corporation of Great Britain
Filed July 18, 1966, Ser. No. 565,899
Claims priority, application Great Britain, July 21, 1965, 30,929/65
6 Claims. (Cl. 188—218)

ABSTRACT OF THE DISCLOSURE

This invention relates to a new and improved ventilated brake disc having ventilation passages which extend from the outer to the inner periphery of the brake disc to provide for circulation of cooling air so that the brake temperature at the opposite braking surfaces of the disc are substantially equalized.

---

This invention relates to disc brakes, and particularly to rotatable brake discs for disc brake assemblies.

One conventional form of brake disc for a disc brake assembly comprises an outer annular disc portion supported by a central dished body portion. In heavy-duty applications, it is conventional practice to provide radially-extending ventilation passages in the annular outer disc portion, the passages each having an opening at the outer peripheral edge of the outer disc portion and another opening at the inner peripheral edge, in or adjacent the inside surface of the central dished portion.

One object of the present invention is to provide a brake disc having an improved arrangement of ventilation passages.

According to one aspect of the invention, a brake disc comprises an annular outer disc portion and a central body portion, the disc portion having a series of ventilation passages formed therein, the passages extending from openings at the outer periphery to openings at the inner periphery of the disc portion, some of the openings at the inner periphery being at one side of the central body portion and others of these openings being at the other side of the central body portion.

According to another aspect of the invention, a brake disc comprises an annular outer disc portion and a central dished body portion, the disc portion having a series of ventilation passages formed therein, the passages extending from openings at the outer periphery to openings at the inner periphery of the disc portion, some of the openings at the inner periphery of the disc portion being formed in or adjacent the inside surface of the dished portion of the brake disc and others of these openings being formed in or adjacent the outside surface of the dished portion of the brake disc.

Preferably, the openings in or adjacent the inside surface of the dished portion of the brake disc are arranged alternately with the openings in or adjacent the outside surface of the dished portion of the brake disc.

One embodiment of the invention will now be described by way of example, with reference to the accompanying drawings in which.

Figure 1:
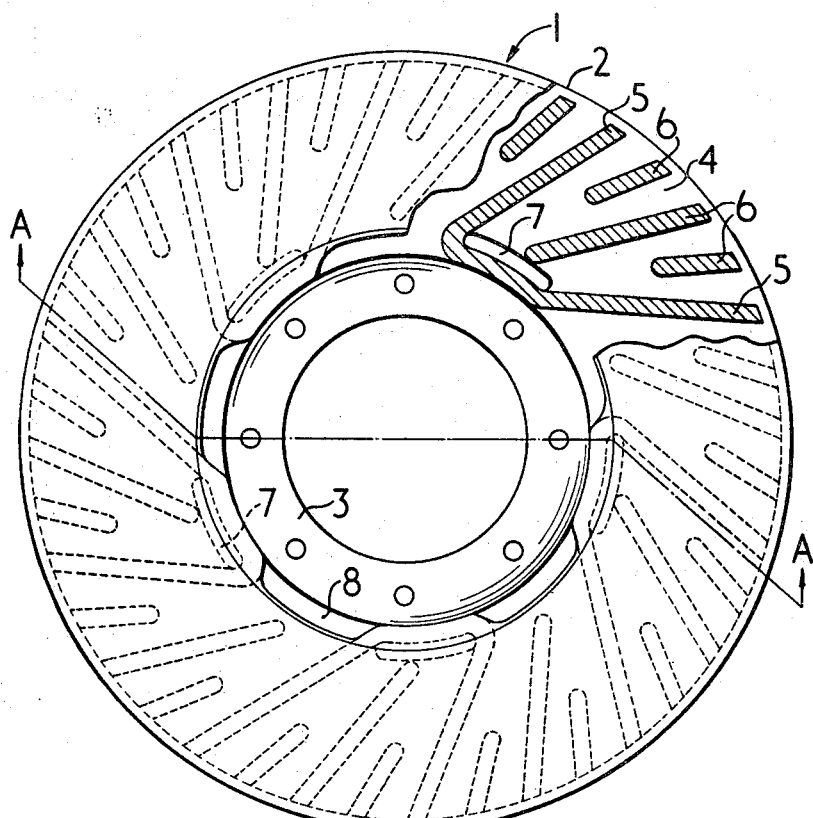
FIGURE 1 is an elevation of a brake disc according to the invention viewed in the axial direction, partly cutaway to show the interior of the disc.
Figure 2:
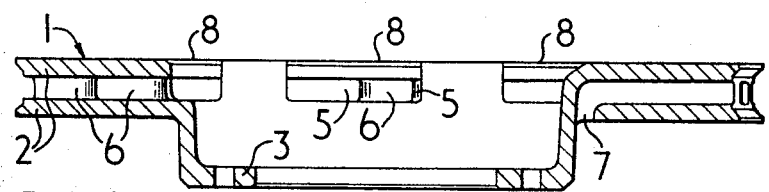
FIGURE 2 is a section of the brake disc shown in FIGURE 1, taken on the line A—A.

The brake disc 1 comprises an annular outer disc portion 2 cast integrally with a central dished body portion 3, by which it can be rotatably mounted on a vehicle axle (not shown). The disc portion is formed with ventilation passages 4 which each extend in a direction which is inclined with respect to the direction of the adjacent radius of the brake disc, the angle of inclination being substantially 30°, and are arranged around the whole circumference of the disc, adjacent passages being spaced apart equally from one another and separated by relatively narrow ribs 5 formed in the casting. Each passage is also provided with one or more reinforcing ribs 6 disposed within the respective passages between the ribs 5.

The outer ends of the passages 4 emerge at the outer periphery of the disc portion 2, and alternate passages have openings 7 at the inner periphery of the disc portion adjacent the outside surface of the dished portion 3 of the disc. The remaining passages have openings 8 formed in the inside surface of the dished portion of the disc near the line of junction between the disc and the dished portion.

By providing openings alternately in or adjacent the inside and outside surfaces of the central dished body portion of the disc several important advantages are obtained.

In the conventional ventilated disc having a dished shape, where all the radially inner openings to the ventilation passages are in or adjacent the inside surface of the body portion of the disc, the side of the disc portion which is axially further from the base of the central dished body portion is only connected to the body portion by the ribs formed in the casting between the ventilation passages, whereas the side of the disc axially nearer to the base of the central dished body portion is connected directly to the body portion around the whole of its inner circumference. Heat can therefore flow easily from the nearer side of the disc into the body portion, thus providing improved cooling for this side of the disc; heat cannot flow easily from the further side of the disc to the body portion since it has first to pass through the ribs to the nearer side of the disc, which is already at a high temperature. Thus in the conventional disc the temperatures and the rates of cooling of the two sides of the disc are unequal, the further side of the disc being subjected to greater temperatures than the nearer side relative to the body portion.

In a disc according to the invention, alternate radially inner openings to the ventilation passages are formed in or adjacent the surface of the disc which is axially nearer to the base of the central dished body portion, instead of all the openings being in or adjacent the axially further surface, and this leaves relatively wide solid portions directly connecting the further side of the disc to the body portion, providing more nearly equal heat conduction paths from the two sides of the disc to the body portion.

In addition to the improved cooling of the side of the disc axially further from the base of the central dished body portion, a brake disc according to the invention has the advantage that the further side of the disc is provided with a more rigid mechanical support by its connection to the body portion. The improved mechanical support, together with the better heat distribution in the disc, renders the further side of the disc less liable to crack, or disintegrate in service. Although the present invention is illustrated and described in connection with certain example embodiments, it will be understood that these are illustrative of the invention and are by no means restrictive thereof. It is reasonably to be expected that those skilled in the art can make numerous revisions and adaptations of the invention, and it is intended that such revisions and adaptations will be included within the scope of the following claims as equivalents of the invention.

Having now described my invention, what I claim is:
1. A brake disc comprising a rigid assembly of an annular outer disc portion and a central dished body portion, the disc portion having formed therein a series of circumferentially spaced ribs each disposed at an angle to the radii of said disc and a series of circumferentially spaced ventilation passages terminating in a series of openings formed at the outer periphery of the disc portion and terminating also in a series of openings at the inner periphery of the disc portion, said openings at the inner periphery of said disc portion having a series of first openings at circumferentially-spaced positions in the side of the disc portion adjacent the central dished body portion, and a series of second openings formed at circumferentially-spaced positions in the side of said disc portion removed from the central dished body portion, the second openings alternating with the first openings around the radially inner periphery of the disc portion and extending into the axially-extending radially inner surface of the central dished body portion to provide direct communication in a generally radial direction with respect to the brake disc between the central dished portion and the ventilation passages.

2. A disc brake according to claim 1 in which the angle of inclination of the ventilation passages with respect to the direction of the adjacent radius of the disc is substantially 30 degrees.

3. A brake disc according to claim 1 in which adjacent passages are separated by said ribs.

4. A brake disc according to claim 1 in which said passages have at least one reinforcing rib disposed within said passages and providing axial strength between the sides of said disc.

5. A brake disc according to claim 1 in which the annular outer disc portion is cast integrally with the central dished body portion.

6. A brake disc according to claim 1 in which adjacent passages are spaced apart equally from one another.

References Cited
UNITED STATES PATENTS

| | | | |
|---|---|---|---|
| 880,266 | 2/1908 | Ast. | |
| 1,717,522 | 6/1929 | Rosenberg | 188—264 |
| 2,242,855 | 5/1941 | Flowers | 188—218 X |
| 2,380,085 | 7/1945 | Tack et al. | 188—218 |

MILTON BUCHLER, *Primary Examiner.*

G. E. A. HALVOSA, *Assistant Examiner.*